(12) United States Patent
Scott et al.

(10) Patent No.: US 8,856,067 B2
(45) Date of Patent: Oct. 7, 2014

(54) METHOD FOR STORING MEDIA CAPTURED USING A PORTABLE ELECTRONIC DEVICE

(75) Inventors: Sherryl Lee Lorraine Scott, Waterloo (CA); Hui-Yu Chang, Burnaby (CA); Thanh Vinh Vuong, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/530,753

(22) Filed: Jun. 22, 2012

(65) Prior Publication Data

US 2012/0265730 A1 Oct. 18, 2012

Related U.S. Application Data

(63) Continuation of application No. 12/958,990, filed on Dec. 2, 2010, which is a continuation of application No. 11/747,257, filed on May 11, 2007, now Pat. No. 7,870,092.

(51) Int. Cl.
*G06F 7/00* (2006.01)
*G06F 17/00* (2006.01)
*G06F 17/30* (2006.01)

(52) U.S. Cl.
CPC ...... *G06F 17/30893* (2013.01); *G06F 17/3028* (2013.01); *G06F 17/30194* (2013.01)
USPC .......................................................... 707/609

(58) Field of Classification Search
CPC ........................................................ G06F 17/30
USPC .......................................................... 707/609
See application file for complete search history.

(56) References Cited

U.S. PATENT DOCUMENTS

| 7,779,358 B1 * | 8/2010 | Gupta et al. .................. 715/730 |
| 7,870,092 B2 | 1/2011 | Scott |
| 2008/0052349 A1 * | 2/2008 | Lin ............................... 709/203 |
| 2008/0147821 A1 * | 6/2008 | Dietrich et al. ............... 709/216 |
| 2008/0168048 A1 * | 7/2008 | Bell et al. ........................ 707/5 |
| 2011/0078111 A1 | 3/2011 | Scott |

* cited by examiner

*Primary Examiner* — Rehana Perveen
*Assistant Examiner* — Raheem Hoffler
(74) *Attorney, Agent, or Firm* — Steven Greenberg, Esq.; CRGO Law (57) ABSTRACT

A method for updating data in a media storage location includes: storing an identity on a portable electronic device, the identity allowing access to the media storage location; storing a file in a device memory of the portable electronic device, the file being captured by a media capturing component of the portable electronic device; and performing a synchronization operation using a media manager, the media manager being in communication with the device memory and the media storage location; the synchronization operation synchronizing data between the device memory and the media storage location.

14 Claims, 9 Drawing Sheets

METHOD FOR STORING MEDIA CAPTURED USING A PORTABLE ELECTRONIC DEVICE

CROSS-REFERENCE TO RELATED APPLICATIONS

The present application is a continuation of U.S. patent application Ser. No. 12/958,990, filed Dec. 2, 2010, which is a continuation of U.S. patent application Ser. No. 11/747,257, filed May 11, 2007 and now issued as U.S. Pat. No. 7,870,092. The entire contents of the above-identified applications is incorporated herein by reference.

FIELD

The present disclosure relates to a method for storing media captured using a portable electronic device, in particular, a method for storing media in a manner that facilitates uploading of the media to a personal computer and/or a media-sharing website.

BACKGROUND

As technology advances, electronic devices continue to become smaller and include more features. Today, electronic devices such as cell phones and personal digital assistants (PDAs), for example, often include phone, email and media capturing/playing capabilities. Often, digital cameras that are integrated into the electronic devices produce photos having a photo quality that is sufficiently high to allow the electronic device to be used as a primary camera.

One drawback of both electronic device cameras and stand-alone cameras is that the amount of memory available for photo storage is limited. As a result, users must upload their photos to another storage location frequently in order to free up storage space on the camera. Many photo-sharing websites exist where users can store their photos for others to view. Examples of photo-sharing websites include: Flickr™, Webshots™, Fotolog™ and MyPhotoAlbum™. In order to upload photos from an electronic device including a camera, the photos are first saved on a personal computer and then uploaded to the photo-sharing website by selecting photos from one or more folders on the computer. Alternatively, the photos may be uploaded directly to the photo-sharing website by emailing the photos to an email address associated with the website. Once the photos have been uploaded, they can be organized and stored in albums.

Photo-sharing accounts often include hundreds or even thousands of photos. The photos may be organized into existing albums or new albums may be created. In addition, meta tags may be associated with the photos in order to allow users to locate photos quickly. The capturing, naming, uploading and organizing processes associated with storing photos captured using an electronic device on a personal computer and/or on a photo-sharing website can be very time consuming. Since these tasks are repeated frequently, it is desirable to reduce the amount of user time spent performing one or more of the steps.

BRIEF DESCRIPTION OF THE DRAWINGS

The embodiments will be better understood with reference to the following Figures in which like numerals denote like parts and in which.

DETAILED DESCRIPTION

In one aspect there is provided a method for updating a media-storage location from an electronic device comprising a media capturing component, the method comprising: creating at least one event tag on the electronic device; capturing at least one media file with a media capturing component of the electronic device; associating the at least one media file with the at least one event tag; and performing an upload operation using a media manager associated with the electronic device, the media manager configured to upload content from the electronic device to the media-storage location to enable the at least one media file to be accessed from the media-storage location by the event tag.

In another aspect there is provided an electronic device configured to capture media and communicate the captured media over a network to a media-storage location, comprising: at least one processor; a media capturing component coupled to the processor; a non-transitory memory storing program instructions which, when executed by the processor, enable the creation of at least one event tag through an interface coupled to the processor prior to capturing at least one media file by the media capturing component, and association of the captured at least one media file with the at least one event tag; and a media manager coupled to the processor and operable to upload content to the networked media-storage location to enable the at least one media file to be accessed from the media-storage location by the associated event tag.

Figure 1:
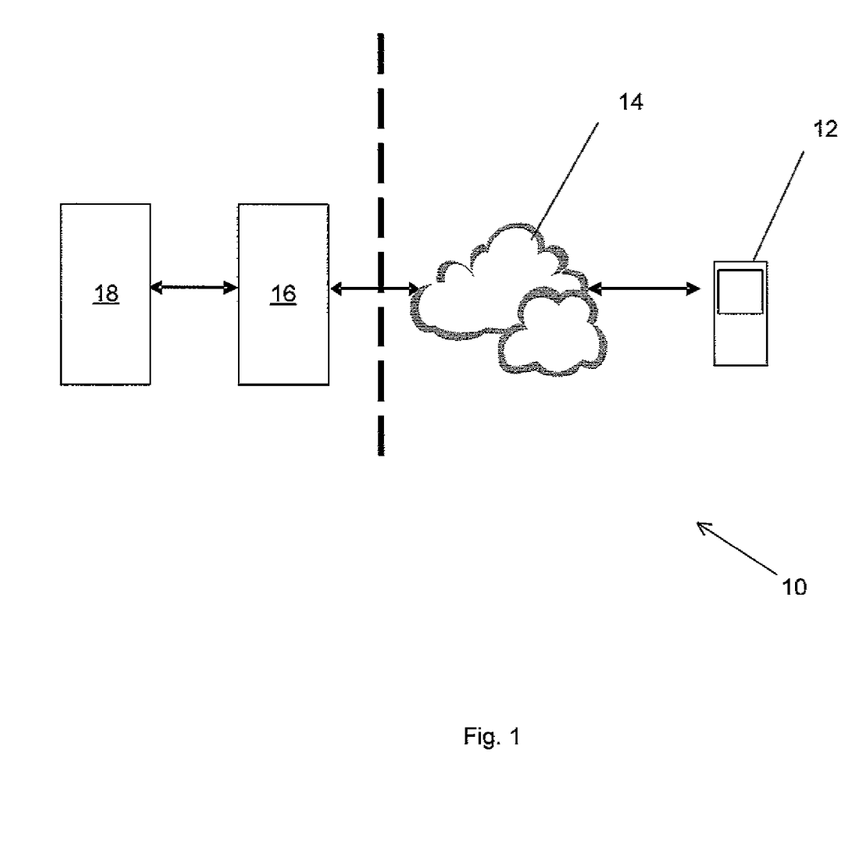
FIG. 1 is a schematic diagram of a wireless communication system.

Referring now to FIG. 1, a communication system 10 for a portable electronic device 12 is generally shown. The portable electronic device 12 is operable to effect voice and data communications over a radio communications channel and communicates with a base station (not shown) while located within a coverage area that is defined by the base station. The base station is part of a wireless network (not shown) that is in communication with the Internet 14. Data is delivered to the portable electronic device 12 via wireless transmission from the base station. Similarly, data is sent from the portable electronic device 12 via wireless transmission to the base station. A server 18 handles wireless client requests from the portable electronic device 12. A firewall, or proxy server, 16, is provided between the server 18 and the Internet 14.

It will be appreciated that the portable electronic device 12 is movable within the coverage area and can be moved to coverage areas defined by other base stations. Further, as will be understood by one skilled in the art, wireless networks include GSM/GPRS, CDPD, TDMA, iDEN, Mobitex, DataTAC networks, EDGE, EVDO or UMTS and broadband networks such as Bluetooth and variants of 802.11.

Figure 2:
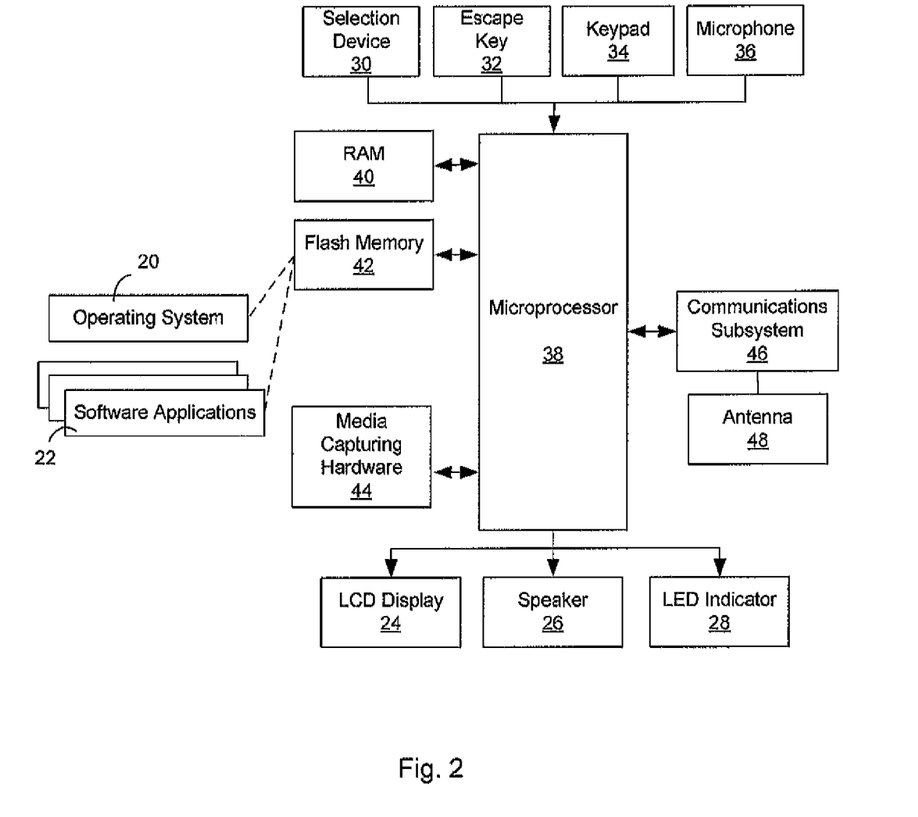
FIG. 2 is a block diagram of components of a portable electronic device according to an embodiment.

Referring now to FIG. 2, a block diagram of certain components, including internal components within the portable electronic device 12, is shown. The portable electronic device 12 is based on a microcomputer that includes a microprocessor 38 connected to a random access memory (RAM) unit 40 and a persistent storage device, which in the present embodiment is a flash memory 42 that is responsible for various non-volatile storage functions of the portable electronic device 12. Operating system software 20 executable by the microprocessor 38 is stored in the flash memory 42. It will be appreciated, however, that the operating system software 20 can be stored in other types of memory such as read-only memory (ROM). In the present embodiment, software applications 22 including Personal Information Manager (PIM) applications are stored in the persistent storage device 42 for execution by the microprocessor 38 for carrying out various functions. The microprocessor 38 receives input from various input devices including selection device 30, such as a trackball or a thumbwheel, for example, escape key 32, keypad 34, and media capturing hardware 44 and outputs to various output devices including LCD display 24, speaker 26 and LED indicator 28.

As indicated above, the flash memory 42 stores a plurality of applications executable by the microprocessor 38 that enable the portable electronic device 12 to perform certain operations including the communication operations referred to above. Applications software is provided including, for example, PIM applications such as an email application, an address book application, a calendar application, a camera application, an audio/video application and a tasks application, as well as other applications such as a Web browser application, an options application and a profiles application.

In a data communication mode, a received signal such as a text message or Web page download is processed by the communications subsystem 46 and input to the microprocessor 38 for further processing of the received signal for output to the LCD display 24. A user of the portable electronic device 12 can also compose data items within a software application such as an e-mail messaging application using the keypad 34, for example, in conjunction with the selection device 30 and the LCD display 24. Such composed items can then be transmitted over the wireless network through the communications subsystem 46 and antenna 48.

Figure 3:
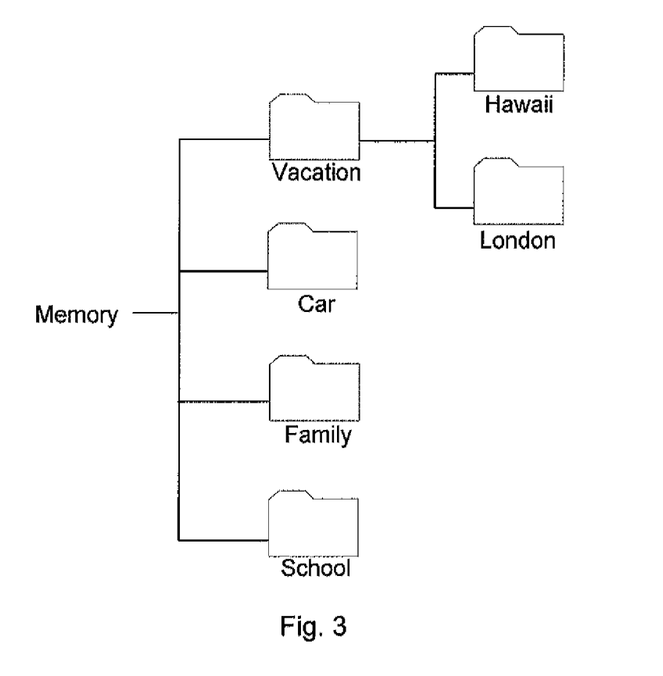
FIG. 3 is an exemplary view of a folder structure for storing files on a portable electronic device.

The media capturing hardware 44 includes a camera and may further include an audio/video recorder or an audio recorder. The camera software is a Java application that interfaces with the camera. Images captured by the camera are stored in flash memory 42 on the device 12. The images may alternatively be stored in a removable memory, such as a smartcard, a compact flash memory, a USB (Universal Serial Bus) drive, a SIM (Subscriber Identity Module) card or another suitable memory. Different types of device memory offer different storage capabilities. For example, SIM cards include a relatively small amount of storage space for image files. The image storage location is a setting that is adjustable by the user. Once the device memory is selected, folders may be created in the selected device memory to organize images on the portable electronic device 12. An example of a folder structure on the device 12 is shown in FIG. 3.

Figure 4:
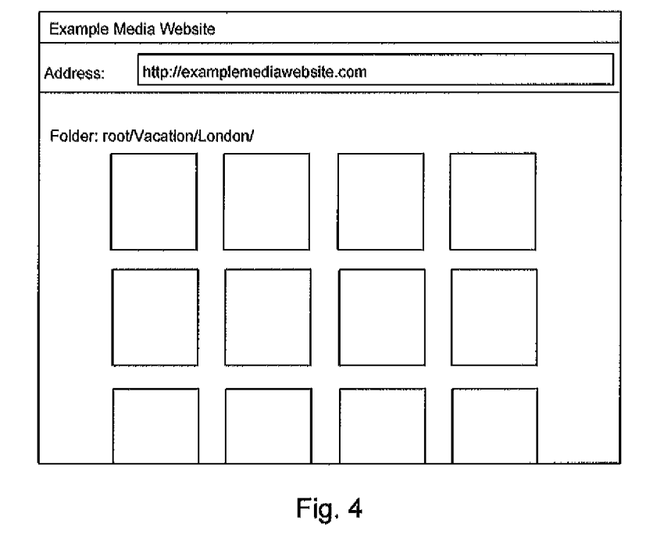
FIG. 4 is a view of an example media website webpage.

Referring to FIG. 4, an example media-sharing website webpage is generally shown. Many different media-sharing websites are available for public use on the Internet including photo-sharing websites: Flickr™, Webshots™, Fotolog™ and MyPhotoAlbum™, for example. These websites allow users to create accounts and store photos. Multiple folders and sub-folders can be created to organize photos.

Figure 5:
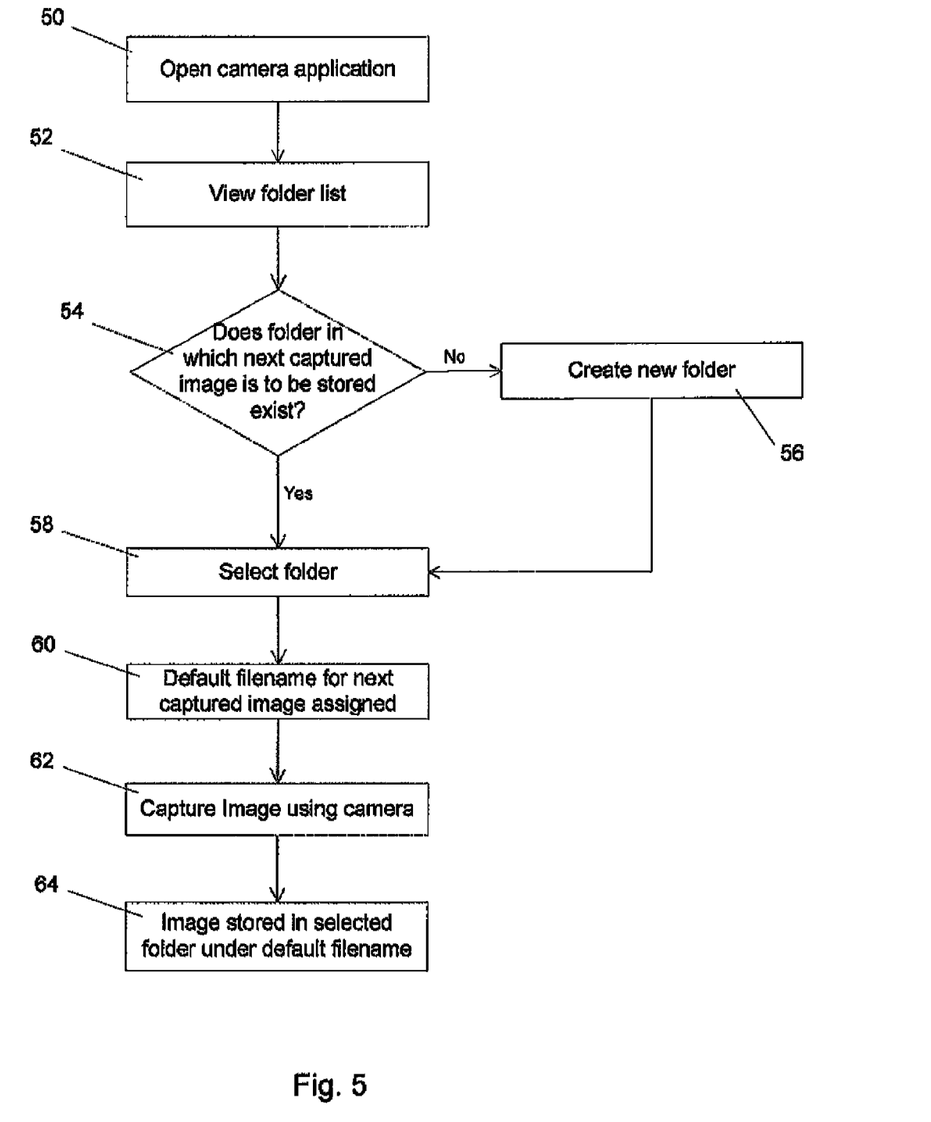
FIG. 5 is a flowchart showing a method of capturing and storing an image on the portable electronic device of FIGS. 1 and 2.

Referring to FIG. 5, a method for capturing and storing an image on a portable electronic device 12 is generally shown. It will be appreciated that the method of FIG. 5 is not limited to images. The method may alternatively be applied to video clips captured using a video recorder of the portable electronic device and audio clips captured using an audio recorder of the portable electronic device. It will be appreciated that the term video clips includes video clips having audio and video-only clips.

Figure 6:
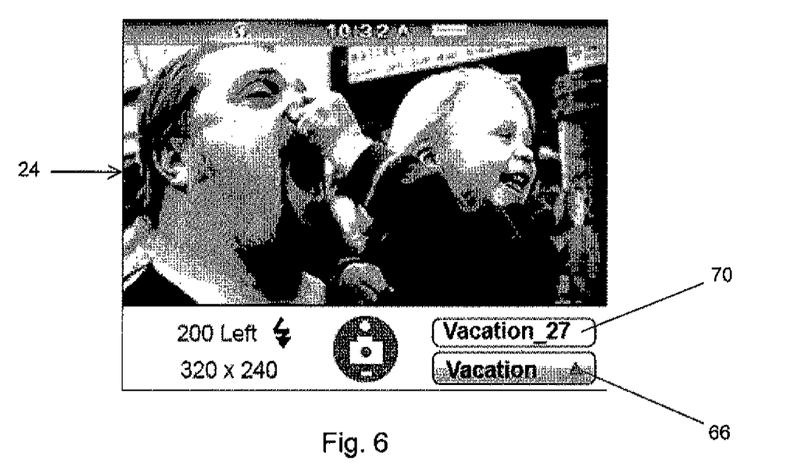
FIGS. 6 through 12 are screen shots of a camera application on the portable electronic device depicting the method of FIG. 6.

At step 50, the camera application is opened on the portable electronic device 12 by selecting a camera application icon (not shown) from the display 24 or by selecting a convenience key on the portable electronic device 12 (not shown). Once the device 12 is operating in camera mode, which is shown in FIG. 6, the user is able to capture an image.

Figure 7:
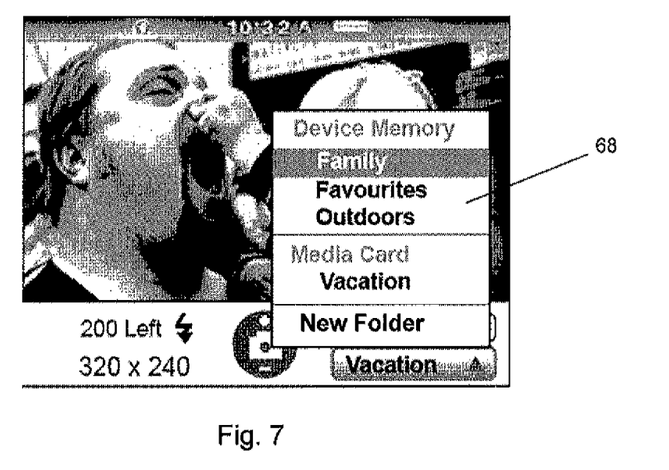

Prior to capturing an image, at step 52, the user clicks on a current folder box 66, which includes a default folder name, in order to view a folder drop down list 68, which is shown in FIG. 7. The default folder name that is displayed corresponds to the folder in which the last captured image was stored. After viewing the folder drop down list 68, the user determines whether or not an appropriate folder exists on the device 12, as indicated at step 54. If the folder exists, it is selected from the folder drop down list 68, as indicated at step 58. If the folder does not exist, a new folder is created, as indicated at step 56.

Figure 8:
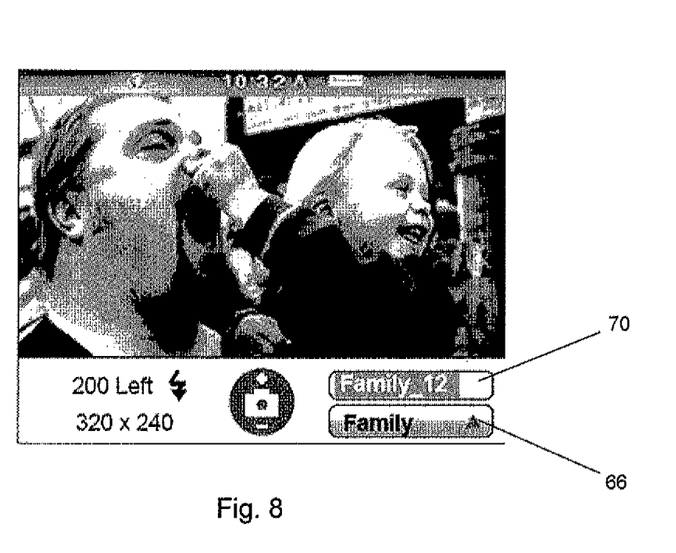

At step 60, a default filename is assigned for the next image to be captured. As shown in FIGS. 6 and 8, a filename box 70 is automatically populated based on the folder selection. The default filename includes: the folder name, an underscore character and the next available image number in that folder. In the example of FIG. 8, the default filename is "Family_12", which indicates that there are already 11 images stored in the folder named "Family".

Figure 9:
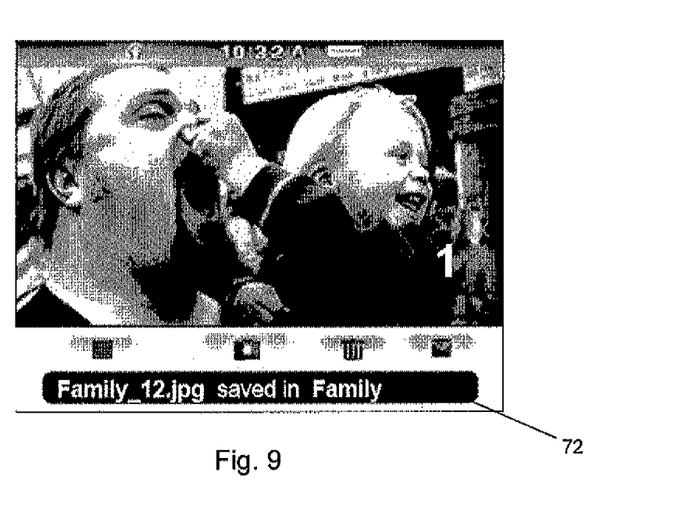

Once the storage destination of the next captured image has been determined, the user takes a picture, as indicated at step 62. As step 64, the image is stored in the selected folder and provided with the default filename. Message bar 72 on the display 24 of FIG. 9 confirms the storage operation.

Figure 10:
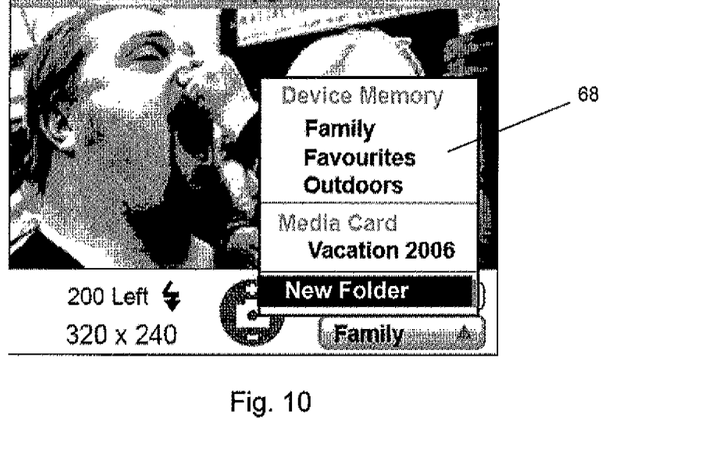
Figure 11:
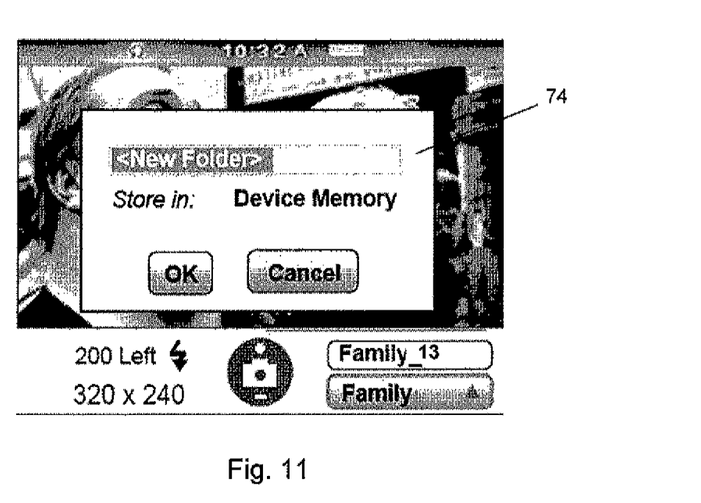
Figure 12:
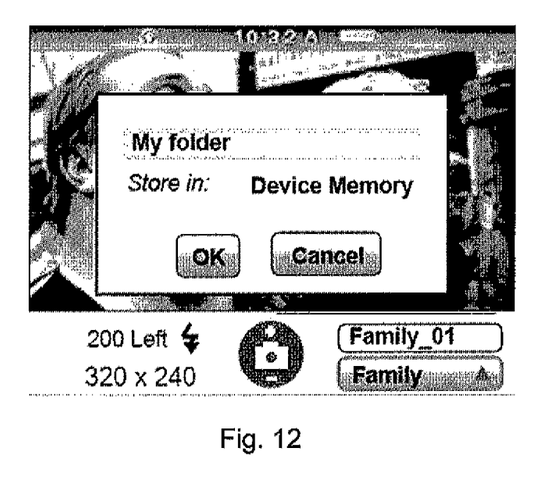

Creation of a new folder at step 56 will now be described. Referring to FIGS. 10 and 11, the user selects a "New Folder" option from the folder drop down list 68 and a folder naming window 74 is launched. The user then types in a name for the new folder, as shown in FIG. 12, and clicks "ok". The new folder has then been created and is selectable from the folder drop down list 68.

Once images are captured using the camera and the image files stored on the portable electronic device 12, the image files and may be uploaded to a photo storage location on a personal computer, an external storage device and/or a photo-sharing website.

Figure 13:
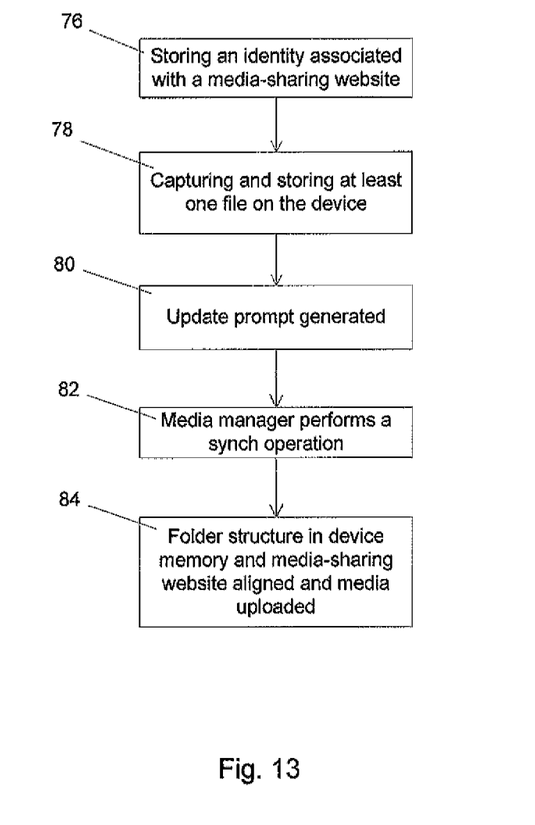
FIG. 13 is a flowchart showing a method of updating a media-sharing website from the portable electronic device of FIGS. 1 and 2.

A method for updating a media-sharing website from the portable electronic device 12 is generally shown in FIG. 13. It will be appreciated that although the method is described for a photo-sharing website, the media-sharing website could alternatively be a website on which video clips and/or audio clips are stored, for example.

At step 76, an identity with the photo-sharing website is stored on the device 12. The identity is created in a manner that is well known in the art and includes a user name and password. The identity allows the device 12 access to an account on the photo hosting website without requiring live user input. The identity is stored in flash memory 42 and may be the same as a work identity, an instant messaging identity or another on-line photo account identity. It will be appreciated that the identity may alternatively be stored in a removable memory, such as a smartcard, a compact flash memory, a USB (Universal Serial Bus) drive, a SIM (Subscriber Identity Module) card or another removable memory. In addition, the identity may be stored on-line.

At step 78, at least one image file is captured by the camera of the portable electronic device 12 and stored on the device 12 in the memory location that was previously selected by the user. The image file may be stored directly on the selected device memory or alternatively folders may be created to organize the photos.

At steps 80 and 82, a photo manager that is in communication with the device memory and the account on the photo-sharing website perform's a synchronization operation in response to an update prompt. The synchronization operation includes: synchronizing folder structure between the device 12 and the photo-sharing website and uploading image files from the device 12 to the photo-sharing website. Synchronizing folder structure includes copying folder information from the device 12 to the photo-sharing website and vice versa in order to maintain parallel folder structure therebetween. Uploading image files includes copying the image files from the folders on the device 12 to similar folders on the photo-sharing website.

Once the synchronization operation has completed, the folder structure in the device memory and the photo-sharing website account is aligned and the image files have been uploaded, as indicated at step 84.

The photo manager is a software application that is stored in flash memory 42 and is executable by the processor 38. During the synchronization operation, data is transferred via the photo manager application, a web browser or an alternate software application 22 on the portable electronic device 12 to the account on the photo-sharing website. The data transfer occurs in response to the update prompt, which is generated manually by the user or automatically at times specified in the photo manager settings.

The user generates the update prompt manually by opening the photo manager application and connecting to the photo-sharing account using the identity. The user then navigates through menu options using the selection device 30 to initiate the synchronization operation.

The update prompt settings of the photo manager control when and how often automatic synchronization updates between the device 12 and the photo-sharing website are performed. The user settings may be changed on the device 12 or, if the identity is stored on-line, changed in the on-line identity and synchronized to one another.

The update prompt may be set to occur at regular intervals, such as every day or every week, for example, or set to initiate the synchronization operation in response to a change in the folder structure and/or content at the device 12, the photo-sharing website or both. Restrictions to the synchronization process may be set including only allowing updates when the device 12 has access to a transfer medium that has a minimum predefined speed. For example, the updates may be set to occur when the device 12 is operating on an EDGE (Enhanced Data GSM environment) network, UMTS (Universal Mobile Telecommunications System) network or another high speed network. Alternatively, for dual-mode wide-area-network (WAN) and cellular devices, updates may be prompted to occur when in WAN coverage. Further, an application may be provided to ping the photo-sharing website and perform updates when there is less traffic on the network to allow for faster file transfer.

It will be appreciated by a person skilled in the art that the synchronization operation is not limited to including both folder alignment and image file upload to the photo-sharing website. Instead, a folder synchronization update prompt could be provided to initiate a folder synchronization operation and an upload update prompt could be provided to initiate an image file upload operation. For example, the folder synchronization update prompt could be set to occur when changes folder structure in the device 12 and/or the photo-sharing website are detected and the upload update prompt could be set to occur once per week. Further, although upload has been described as including only copying image files from the device 12 to the photo-sharing website, uploading could also include copying image files from the photo-sharing website to the device 12. A user setting would be provided to specify the parameters for uploading.

In another embodiment, the update prompt does not automatically initiate the synchronization operation. Instead, the photo manager prompts the user of the device 12 to perform an update when the device 12 is plugged into a personal computer. When plugged into the personal computer, the device 12 has access to faster bandwidth, which will increase the speed of data transfer. The photo manager may send a pop-up message or prompt the user in another manner in order to notify the user that there is an update to be performed. In this embodiment, the synchronization operation is launched by the user and does not take place automatically.

In yet another embodiment, the photo manager is stored on-line rather than on the portable electronic device 12. When an update is performed, files are transferred from the device 12 to the on-line photo manager. The files are then distributed from the photo manager to a single or multiple photo-sharing website accounts. Storing the photo manager on-line provides more memory since there is no device memory limitation. Further, people other than the user are able to access the photo manager when it is on-line so that viewing and editing operations within the photo manager is not limited to the user.

Specific embodiments have been shown and described herein. However, modifications and variations may occur to those skilled in the art. All such modifications and variations are believed to be within the sphere and scope of the present embodiments.

The invention claimed is:

1. A method for updating a media-storage location from an electronic device comprising a media capturing component, the method comprising:

naming different folders on the electronic device with correspondingly different names, the different folders each named by receiving a corresponding name at the electronic device via an input device of the electronic device;

capturing at least one media file with a media capturing component of the electronic device;

selecting one of the different folders on the electronic device, associating the at least one media file with a variation of a name for the selected one of the different folders on the electronic device that includes the name for the selected one of the different folders on the electronic device and storing the at least one media file in the selected one of the different folders on the electronic device; and performing an upload operation to a remote server using a media manager associated with the electronic device, the media manager being configured to upload content from the electronic device to the media-storage location of the remote server to enable the at least one media file to be accessed from the media-storage location on the remote server by the variation of the name, a new folder corresponding to a name of the selected one of the different folders created at the media-storage location as part of a synchronization operation with the electronic device.

2. The method of claim 1, wherein the upload operation is a synchronization operation in response to an update prompt.

3. The method of claim 1, wherein the variation of the name includes a sequence number.

4. The method of claim 1, wherein said media capturing component is a camera and the media-storage location enables the media to be accessed on a photo-sharing website.

5. The method of claim 1, wherein the media capturing component is an audio/video recorder and the media-storage location enables the media to be accessed on an audio/video-sharing website.

6. An electronic device configured to capture media and communicate the captured media over a network to a media-storage location, comprising:

at least one processor;
   a media capturing component coupled to the processor;
   a non-transitory memory storing program instructions which, when executed by the processor, enable the naming of different folders with correspondingly different names, the different folders each named by receiving a corresponding name at the electronic device via an input device of the electronic device, through an interface coupled to the processor prior to capturing at least one media file by the media capturing component, the selecting of one of the different folders on the electronic device, the associating of the at least one media file with a variation of a name for the selected one of the different folders that includes the name for the selected one of the different folders on the electronic device and the storing the at least one media file in the selected one of the different folders on the electronic device; and
   a media manager coupled to the processor and operable to upload content to the networked media-storage location to enable the at least one media file to be accessed from the media-storage location by the variation of the name, a new folder corresponding to a name of the selected one of the different folders created at the media-storage location as part of a synchronization operation with the electronic device.

7. The electronic device of claim 6, wherein the variation of the name includes a sequence number and the processor is further configured to store the at least one media file in the selected one of the different folders using the variation of the name.

8. The electronic device of claim 6, wherein the processor is further configured to perform a synchronization operation to synchronize data between the electronic device and the networked media-storage location such that the at least one media file is stored in the media-storage location using the variation of the name.

9. The electronic device of claim 6, wherein the media storage location is enables the media to be accessed on a media-sharing website.

10. The electronic device of claim 6, wherein the media storage location is a personal computer.

11. The electronic device of claim 6, wherein the media storage location is an external storage device.

12. The electronic device of claim 7, wherein the sequence number corresponds to a number of media files in the folder incremented by one.

13. The electronic device of claim 6, wherein the media capturing component is a camera.

14. The electronic device of claim 6, wherein the media capturing component is an audio/video recorder.

* * * * *